United States Patent [19]

Johnson

[11] Patent Number: 4,597,414
[45] Date of Patent: Jul. 1, 1986

[54] TWO POSITION CONTROL VALVE

[75] Inventor: LeRoy B. Johnson, Perry, Mich.

[73] Assignee: Schmelzer Corporation, Flint, Mich.

[21] Appl. No.: 738,768

[22] Filed: May 29, 1985

Related U.S. Application Data

[63] Continuation of Ser. No. 389,026, Jun. 16, 1982, abandoned.

[51] Int. Cl.⁴ ............................................. F16K 11/065
[52] U.S. Cl. .................................. 137/625.25; 251/75; 251/158
[58] Field of Search ................... 137/625.25; 251/75, 251/158, 113, 176, 177, 162, 163

[56] References Cited

U.S. PATENT DOCUMENTS

| | | | |
|---|---|---|---|
| 1,839,053 | 12/1931 | Schaded | 251/113 |
| 1,927,153 | 9/1933 | Conrader | 251/118 X |
| 2,591,118 | 4/1952 | Bent . | |
| 2,911,006 | 11/1959 | Vogel . | |
| 2,942,584 | 6/1960 | Rethmeier . | |
| 3,077,207 | 2/1963 | Koutnik | 137/625.25 |
| 3,338,268 | 8/1967 | Houser | 137/625.25 |
| 3,443,592 | 5/1969 | Felmlee | 251/162 |
| 3,530,893 | 9/1970 | Masuda . | |
| 3,959,024 | 5/1976 | Kirk | 137/625.25 |
| 4,144,905 | 3/1979 | Bauer | 137/625.25 |
| 4,292,997 | 10/1981 | Bernat . | |

Primary Examiner—Alan Cohan
Attorney, Agent, or Firm—Harness, Dickey & Pierce

[57] ABSTRACT

A two position control valve having a body member with a control surface and a slide member incorporating a seal supported by the body member for sliding movement relative to the control surface and forming a control chamber placing selected ones of a plurality of control ports in communication with each other.

8 Claims, 5 Drawing Figures

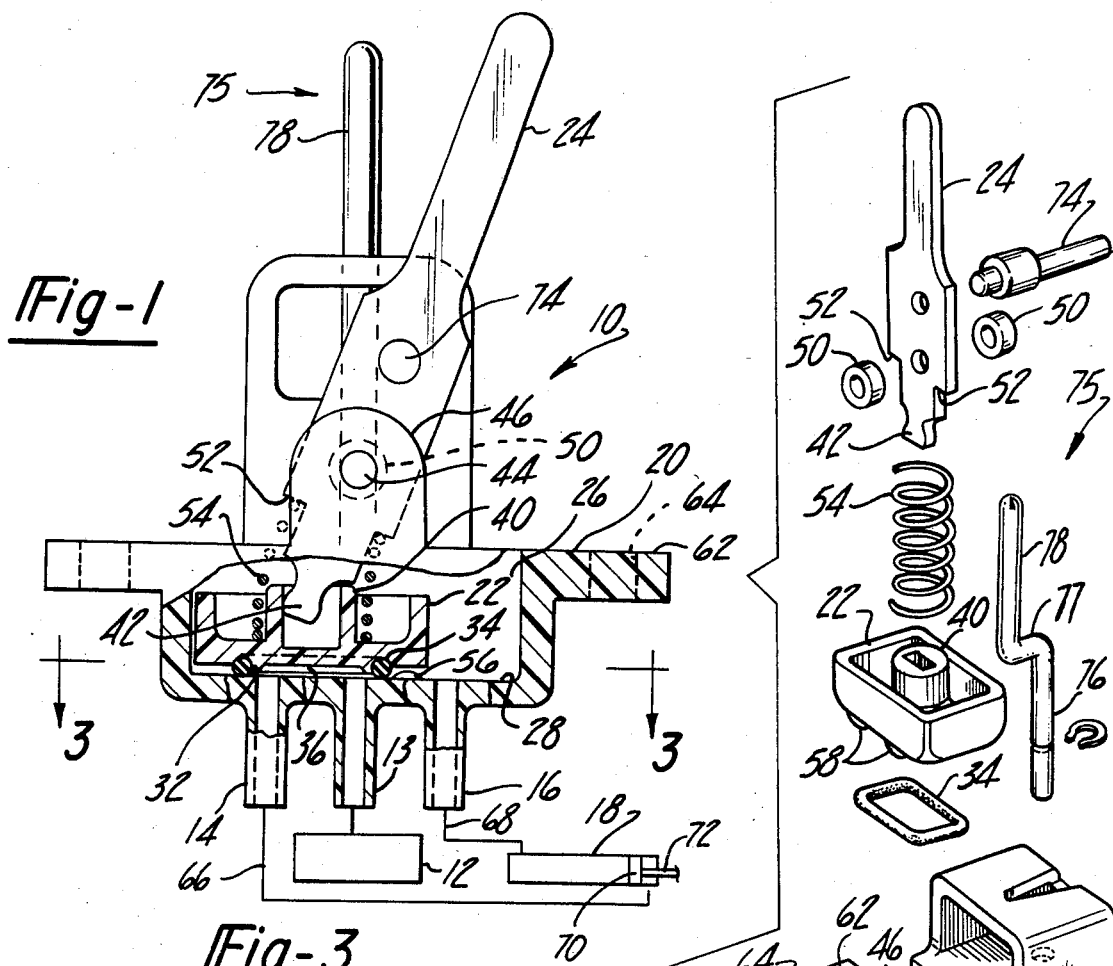

TWO POSITION CONTROL VALVE

This is a continuation of application Ser. No. 389,026, filed June 16, 1982, now abandoned.

This invention relates to fluid control valves and in particular to a two position valve.

There is a need for simple economical two position, slide type valves. Present valves, even for low pressure operation, incorporate a multiplicity of parts making them complex, expensive to manufacture and maintain.

It is an object of the invention to provide a simple two position valve incorporating a minimum number of parts.

Another object of the invention is to provide a two position valve in which the valve is maintained in selected one of its two possible positions.

Yet another object of the invention is to provide a two position valve in which porting between selected ones of inlet and control parts is achieved by a simple, commonly available sealing element.

The objects of the invention are accomplished by the provision of a two position valve having a body with a planar control surface to which a supply or inlet port as well as control ports communicate. A slide member is supported by the body member for movement relative to the planer surface between a selected one of two positions. The slide member incorporates a seal element mounted on the slide member for movement therewith and slidingly engaging the control surface to form a control chamber whenever the valve is in one of its two selected positions. The slide member is movable by a handle manually operated to position the slide member in one of its two selected positions. In one of the positions, the supply port is in communication with one control port and in a second position of the slide the supply port is in communication with another control port. The handle and slide are so arranged that a spring continues to bias the slide member into sealing and sliding contact with the control surface when the slide member is in one of its two selected positions. The spring acts also to provide an over-center action which maintains the valve in one of its two selected positions. To insure that the valve cannot be accidentally moved from its selected position, the handle is provided with a detent arrangement releasably holding the handle in one of its two control positions.

The preferred embodiment of the invention is illustrated in the drawings in which:

FIG. 1 is a cross-sectional view of the two position valve embodying the invention;

FIG. 2 is a perspective view of the valve seen in FIG. 1;

FIG. 3 is a cross-sectional view taken on line 3—3 in FIG. 1;

FIG. 4 is a cross-sectional view similar to FIG. 3 showing another condition of operations; and FIG. 5 is a cross-sectional view taken on line 5—5 in FIG. 3.

The two position valve embodying the invention is designated at 10 and is particularly adapted for controlling fluid flow from a source 12 through an inlet port 13 to a selected one of control ports 14 and 16 which in the present instance are illustrated as connected by fluid lines to opposite ends of the two way linear actuator 18.

The valve 10 includes a body member 20 supporting a slide member 22 movable from one position to another through means of a manually operated handle 24. The body member 20 incorporates an open recess 26 which receives and guides the slide member 22 during its movement. The recess 26 has a generally rectangular bottom wall which forms a planer control surface 28. The delivery port 13 and the control ports 14 and 16 open to the planer control surface 28.

Referring to FIG. 1, the slide member 22 is generally cup-shaped and has a bottom surface 30 which is provided with a rectangular shaped porting ring 32 formed integrally at the underside of the slide member 22. The porting ring 32 acts as a support for the inner perimeter of a seal 34. The seal 34 is in the form of a circular O-ring and is stretched over the outside perimeter of the rectangular porting ring 32. In the position shown in FIG. 1, the seal 34 is in engagement with the control surface 28 and defines a movable control chamber 36 which is formed between the bottom of the slide member 22 and the planer control surface 28. In the position illustrated in FIG. 3, the control chamber 36 is located so that the delivery port 13 and control port 14 communicate with each other through the control chamber 36. In FIG. 4, the control chamber 36 communicates the other of the control ports 16 with the delivery port 13.

The slide member 22 is provided with a socket 40 formed integrally with the slide member 22 to receive a projection 42 on the end of the handle 25. The handle 24 is supported for pivotal movement about a pin 44, the opposite ends of which are supported by an ear 46 and opposed wall 48 formed in the body member 20. The pin 44 also supports a pair of collars 50 at opposite sides of the handle 24 to maintain it midway between the ear 46 and wall 48. The handle 24 is provided with opposed surfaces 52 forming a seat for one end of a compression spring 54, the opposite end of which is seated in the generally cup-shaped slide member 22 around the socket 40. The spring 54 acts between the seat 52 and the slide member 22 to urge the latter and the seal 34 against the control surface 28.

The body member 20 and the slide member 22 are provided with complementary cam means in the form of cam portions 56 on the body member 20 and cam projections 58 on the slide member 22. The cam portions 56 project above the control surface 28 at the opposed longitudinally extending walls 60 of the recess 26 as seen in FIGS. 3 and 4. The cam portions 48 are formed on the bottom of the slide member 22 at opposed sides in proximity to the wall 60 of the body member 20.

In the initial position of the valve 10, as seen in FIGS. 1 and 3, the slide member 22 is in a first position to the left with the cam portions 56 and 58 in proximity to each other. Upon movement of the handle 24 counterclockwise about the pivot pin 44 as seen in FIG. 1, the slide member 22 moves toward the right and the cam portions 56 and 58 engage to cause the sliding member 22 to move upwardly against the biasing action of the spring 54 until the cam portion 58 passes from the left side to the right side of the cam portion 56 so that the slide member 22 assumes a second position illustrated in FIG. 4. In the first position, seen in FIG. 3, the delivery port 13 and control port 14 are in communication with each other. During movement of the slide member 22 between its first and second positions, as illustrated in FIGS. 3 and 4, respectively, the slide member 22 moves upwardly due to the action of the complementary cam portions 56 and 58 and remains parallel to the control surface 28 until the slide member reaches its second position.

Both the body member 20 and the slide member 22 can be made of a plastic material reinforced with glass fibers, for example, two-thirds nylon and one-third glass fiber by volume. The body member 20 can be provided with flanges 62 having bolt receiving openings 64 to receive mounting bolts fastening the body member 20 in position for use.

To explain operation of the valve 10, it can be assumed that it is installed in a motor vehicle and that the source of fluid pressure 12 is in the form of vacuum obtained at the intake manifold of an internal combustion engine powering the vehicle. Assuming also that the valve 10 is initially positioned as illustrated in FIG. 1, vacuum pressure will be continuously available to the linear actuator 18. The path of such fluid pressure is from the source 12, through the delivery port 13 to the control chamber 36 and to the first control port 14 which may be connected by a line 66 in the form of a tube or the like to the right end of the linear actuator 18. The left end of the linear actuator 18 will be in communication with the atmosphere through another line 68 connected between the linear actuator 18 and the second control port 16 which is open to the recess 26 and to the atmosphere. Consequently, the differential in pressure acting on the piston 70 will be atmospheric pressure acting at the left and vacuum pressure acting at the right causing the piston 70 to to assume a position at the right end of the linear actuator 18. When it is desired to extend the rod 72 of the linear actuator 18 by moving the piston 70 to the left end of the cylinder, the handle 24 is moved in a counterclockwise direction as viewed in FIG. 1 so that the slide member 22 moves upwardly due to the action of the complementary cam portions 56 and 58 so that the slide member passes to the other end of the recess 26 to reengage the seal 34 with the control surface 28. This brings the delivery port 13 and second control port 16 into communication with each other as illustrated in FIG. 4. Consequently, the source of vacuum pressure communicates through the delivery port 13, the control chamber 36 and the control port 16 and line 68 with the right end of the linear actuator 18. At the same time, the control port 14 will be in communication with the atmosphere so that the differential in pressure created within the linear actuator 18 causes the piston 70 to move to the left to extend the piston rod 72. Upon return of the handle 24 in the opposite direction, the piston 70 moves in the opposite direction or to the right.

The operation of the valve is such that the spring 54 continues to urge the slide member 22 downwardly as a result of which the valve 10 has an over-center characteristic, that is, the valve is always located in one or the other of its two possible positions and remains in that position until it is selectively and manually moved to the other of its two positions.

If desired, and to insure that the valve 10 remains in the selected one of its two positions, a pin 74 is mounted to extend transversely to the handle 24. The pin 74 interfers with a sliding lock pin 75. The lock pin 75 has a lower portion 76 supported for sliding movement vertically relative to the body member as illustrated in FIG. 1. The lock pin 75 also has an off set portion 77 and a handle portion 78. The handle portion 78 interferes with the pin 74 to prevent movement of the handle 24 when the valve 10 is in one of its two selected positions. When it is desired to move the handle 24 to the other of its selected positions, the lock pin 75 is pulled upwardly so that the handle 24 can be pivoted with the pin 74 passing under the off set portion 77. After the valve 10 is placed in its newly selected position of operation the lock pin 75 can be released so that the handle portion 78 again interferes with the pin 74 to prevent swinging of the handle 24.

A two position control valve has been provided in which a body member and a slide member coact to form a control chamber capable of placing selected ones of a plurality of ports in communication with each other. The control chamber is formed in part by an O-ring which is stretched over a supporting portion on the slide member. The slide member is movable from one selected position to another selected position against the biasing action of the spring which serves to maintain the valve in its selected condition.

The embodiments of the invention in which an exclusive property or privilege is claimed are defined as follows:

1. A two position fluid control valve comprising: a body having a planar control surface, a slide member supported by said body for reciprocating movement relative to said planar surface between first and second positions, a rectilinear porting ring formed integrally on said slide member, an O-ring seal element mounted on said rectilinear porting ring and being in sliding and sealing engagement with said planar control surface, said seal element forming an endless border of a control chamber formed between said planar surface and said slide member, first, second and third ports opening to said planar surface, said first and second ports being in communication with each other through said control chamber when said slide member is in said first position and said first and third ports being in communication with each other through said control chamber when said slide member is in said second position, a lever pivoted in an over-center spaced relation to said ports of said planar surface and having an end disposed in a socket formed in said slide for moving said slide member between said first and second positions upon movement of said lever about said pivot,
   a spring having opposite ends seated on said lever and on said slide member for urging said slide member towards said planar surface during movement between said first and second positions,
   cam means formed integrally with said slide member and with said planar surface and being engageable with each other upon movement of said slide member, between said first and second positions, to move said slide member and said planar surface apart and lift said O-ring from said planar surface, said cam means comprising a plurality of adjacently spaced projections formed on said slide member and said planar surface and each having an arcuate surface.

2. The valve of claim 1 and further comprising means selectively movable between a position engaging said handle to prevent movement from its selected position and a position permitting movement between said selected positions.

3. A two position fluid control valve, comprising:
   a body formed with a generally rectilinear recess which provides a planar control surface, and formed with a central supply port and first and second delivery port, said supply and delivery ports being in communication with said planar control surface;
   a slide member disposed for lateral reciprocating movement in said recess relative to said planar surface of said body between first and second positions, asid slide member being formed with a rectilinear porting ring facing said planar control surface of said body;

an O-ring seal element mounted on said rectilinear porting ring of said slide member, said O-ring sealing element forming an endless border of a control chamber between said planar control surface and said slide member such that when said slide member is in said first position said supply port is in communication with said first delivery port through said control chamber and said second delivery port is in communication with the atmosphere, and when said slide member is in said second position said supply port is in communication with said second delivery port through said control chamber and said first delivery port is in communication with the atmosphere;

a manually actuable lever for causing the lateral reciprocating movement of said slide member between said first and second positions, said lever having one end disposed in a socket formed in said slide member, and said lever being mounted to said body for an over-center pivotal movement between said first and second positions;

a spring coaxially disposed around a portion of said lever and said socket of said slide member, and having one end seated against an outward extending surface of said lever and the other end seated against said slide member, said spring urging said slide member towards said planar surface such that when said slide member is disposed in said first and second positions said O-ring seal element is in sealing engagement with said planar control surface of said body; and complementary cam means formed integrally with said planar control surface of said body and said slide member for causing said slide member to move first upwardly against the biasing action of said spring when said slide member is being moved between said first and second positions and then downwardly with the biasing action of said spring when said slide member approaches the position to which it is being moved to, such that said O-ring seal element is lifted from said planar control surface only during the movement between said first and second positions, said cam means comprising a pair of laterally spaced adjacent projections disposed in parallel along the two opposite corresponding sides of both said slide member and said planar control surface, with each of said projections being formed with an arcuate surface, such that the combination of the biasing action of said spring and said cam means tends to force said slide member into one of said first and second positions.

4. The valve of claim 3, wherein each of said projections are disposed outside of the control chamber formed in part by said O-ring seal element.

5. The valve of claim 4, wherein said supply port is generally axially aligned with the pivoting point of said lever.

6. The valve of claim 5, wherein said supply port is a vacuum port.

7. The valve of claim 6, wherein said slide member, said planar control and said porting ring are all rectangular.

8. A two position fluid control valve, comprising:
body means for providing a pair of delivery ports and a supply port disposed between said delivery ports;
slide means disposed in a recess of said body means for lateral reciprocating movement between a first and second position;
seal means secured to said slide means for providing communication between said supply port and one of said delivery ports when said slide means is in said first position and for providing communication between said supply port and the other of said delivery ports when said slide means is in said second position;
manually actuated lever means mounted to said body means to provide over-center pivoting movement for causing said slide means to move between said first and second positions; and
spring biasing means associated with said lever means and complementary cam means integrally formed on opposing surfaces of said body and slide means for acting in cooperation to form said slide means toward one of said first and second positions, said cam means comprising a pair of laterally spaced adjacent projections disposed in parallel along the two opposite corresponding sides of both said slide and body means, with each of said projections being formed with an arcuate surface.

* * * * *

UNITED STATES PATENT AND TRADEMARK OFFICE
CERTIFICATE OF CORRECTION

PATENT NO. : 4,597,414
DATED : July 1, 1986
INVENTOR(S) : LeRoy B. Johnson

It is certified that error appears in the above-identified patent and that said Letters Patent is hereby corrected as shown below:

Column 1, line 20, "parts" should be --ports--.
Column 1, line 27, "planer" should be --planar--(*).
Column 2, line 4, "planer" should be --planar--.
Column 2, line 6, "planer" should be --planar--.
Column 2, line 18, "planer" should be --planar--.
Column 2, line 26, "25" should be --24--.(*)
Column 2, line 42, "projections" should be --portions--.
Column 2, line 45, "48" should be --58--.
Column 2, line 55, "sliding" should be --slide--.
Column 3, line 27, delete "2", second occurrence.
Column 5, line 2, "asid" should be --said--.
Column 6, line 40, "form$" should be --force--.

Signed and Sealed this

Twenty-fourth Day of February, 1987

Attest:

DONALD J. QUIGG

Attesting Officer  Commissioner of Patents and Trademarks